US006707378B2

(12) United States Patent
MacNeille et al.

(10) Patent No.: US 6,707,378 B2
(45) Date of Patent: Mar. 16, 2004

(54) INTER-VEHICLE WIRELESS COMMUNICATION AND WARNING SYSTEM

(75) Inventors: Perry Robinson MacNeille, Lathrup Village, MI (US); Ronald Hugh Miller, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/064,243

(22) Filed: Jun. 25, 2002

(65) Prior Publication Data

US 2003/0234720 A1 Dec. 25, 2003

(51) Int. Cl.[7] .................................................. B60Q 1/00

(52) U.S. Cl. ........................ 340/435; 340/436; 340/903; 455/99; 342/457; 701/117; 701/300; 701/301

(58) Field of Search ................................. 340/435, 436, 340/903, 905; 455/456.1, 456.2, 517, 99; 342/457, 357.08, 357.06, 450; 701/1, 117, 300, 301, 207, 1.18, 119

(56) References Cited

U.S. PATENT DOCUMENTS 4,783,799 A 11/1988 Maass
5,081,705 A 1/1992 Swanke
5,970,400 A 10/1999 Dwyer
6,229,486 B1 5/2001 Krile
6,359,552 B1 * 3/2002 King .......................... 340/436
6,405,132 B1 * 6/2002 Breed et al. ................ 701/301
6,437,688 B1 * 8/2002 Kobayashi .................. 340/435

OTHER PUBLICATIONS

David B. Johnson and David A. Maltz, Dynamic Source Routing in Ad Hoc Wireless Networks, Computer Science Dept., Carnegie Mellon University, pp. 1–18.

David B. Johnson, Routing in Ad Hock Networks of Mobile Hosts, Computer Science Dept., Carnegie Mellon Univesity, pp. 6.

* cited by examiner

*Primary Examiner*—Daryl Pope
(74) *Attorney, Agent, or Firm*—Frank A. MacKenzie; Artz & Artz

(57) ABSTRACT

An inter-vehicle wireless communication and warning system (50) for a host vehicle (52) within a wireless communication network is provided. The system includes a first variable antenna (54) that receives a vehicle discovery signal and a variable amplifier (56) that is electrically coupled to the first variable antenna (54), which modifies the vehicle discovery signal. A smart transmission antenna (62) focuses and transmits a pattern signal to at least another vehicle in the wireless communication network. A smart antenna amplifier (66) is electrically coupled to the smart antenna (62) and modifies the pattern signal. A main controller (58) is electrically coupled to the variable amplifier (56), the smart antenna amplifier (66), and a vehicle network (60). The main controller (58) generates the pattern signal in response to the vehicle discovery signal and a vehicle network signal.

20 Claims, 4 Drawing Sheets

INTER-VEHICLE WIRELESS COMMUNICATION AND WARNING SYSTEM

BACKGROUND OF INVENTION

The present invention relates generally to vehicle communication systems, and more particularly, to a method and apparatus for communicating between multiple vehicles in a close proximity of each other.

Collision countermeasure and warning systems are becoming more widely used. Collision countermeasure and warning systems detect objects or vehicles within close proximity of a host vehicle and perform safety operations so as to prevent or minimize the likelihood of a collision and any resulting injury to an occupant.

In the development of collision countermeasure and warning systems vehicle-to-vehicle communications has been suggested for increased host vehicle awareness of other vehicles or potentially hazardous conditions that may exist within a close proximity to the host vehicle.

Vehicle-to-vehicle communication for safety purposes requires several distinct types of data communication. A host vehicle should be aware of vehicles that may be approaching from multiple directions and at various velocities. A host vehicle should also be aware of various traffic conditions, such as a slow moving congested traffic situation versus a clear faster moving situation when a first vehicle may pass a second vehicle. Thus, a host vehicle in motion must be able to discover and communicate with additional vehicles that are traveling in a concurrent manner, including vehicles approaching from a forward, rearward, or lateral direction of a host vehicle.

Traditional vehicle communication systems have a vehicle time delay discovery problem. The faster the vehicles are moving the more significant the time delay becomes. Traditional vehicle communication systems operate sufficiently in discovering vehicles in a close proximity under slow moving traffic conditions. Generally, during a slow moving traffic condition vehicles tend to remain in host vehicle range for a reasonable amount of time, allowing the host vehicle to discover the vehicles without any timing issues. The timing issues become more evident when a vehicle is approaching in a lateral direction, and are a particular concern for vehicles approaching from the forward or rearward directions. Vehicles approaching from the forward or rearward directions, such as during a passing situation, must be discovered at a relatively large distance from the host vehicle. Large time delays must be overcome in discovery of a passing vehicle as compared with time that is actually required to pass a vehicle, which is short.

The lateral approaching vehicle situation introduces an additional problem with existing vehicle communication systems. Objects between the host vehicle and the approaching vehicle may block communication signals and make detecting laterally approaching vehicles difficult. Thus, network communication is crucial to provide advanced warning of objects or potential hazards to vehicles within the network.

Ad hoc wireless mobile networks are commonly used because of their associated desirable benefits for vehicle-to-vehicle data communication including: lack of reliance on third party infrastructures, ability to adapt to local conditions readily, ability to allocate resources on a local level, and absence of single points of failure. Also, commodity implementations of ad hoc networking hardware are readily available and well proven. However, ad hoc wireless mobile networks have disadvantages associated with routing of communication signals.

Traditional networks differ from wireless mobile networks in that the network devices are connected in contained network spaces in which each device has equal access to the other devices, and communicate through a single network device to access another network space. Furthermore, in traditional networks, the addressing of individual devices is abstracted from the geographical relationship between devices. Ad hoc wireless mobile network devices, however, do not have contained network spaces or equal access to other devices. Additionally, connection between devices is very location dependent because wireless network devices have finite range.

Vehicle-to-vehicle network devices are constantly moving in and out of range and topology of the network is constantly changing. The density of the network is also constantly changing. Therefore, traditional dynamic network routing concepts, in which devices are discovered on the network and routes between devices are calculated and stored, are difficult to apply.

Referring now to FIG. 1, a vehicle communication signal pattern diagram 10 for multiple vehicles 12 in a tight cluster situation using ad hoc vehicle communication and omni-directional antennas, is shown. Arbitration is easily handled between the omni-directional antennas using collision detection and recovery or time domain multiplexing approaches. Each vehicle is able to communicate with every other vehicle in the tight cluster due to overlapping of each vehicle transmission range 14.

Referring now to FIG. 2, a vehicle communication signal pattern diagram 16 for multiple vehicles 18 in a spread out cluster situation using ad hoc vehicle communication and omni-directional antennas, is shown. When a cluster of vehicles 20 is spread out enough that not all vehicles are in communication range of each other, then handshaking mechanisms are required. The handshaking mechanisms can become congested. As an illustrative example, vehicle A may transmit a request to send (RTS) to vehicle B, vehicle B then responds with a clear to send (CTS) to vehicle A. Since vehicle C is in range of vehicle B, vehicle C must wait to respond to a RTS from vehicle D so as not to conflict with vehicle A"s transmission to vehicle B. Vehicle E sends a RTS to vehicle D, but vehicle D is waiting for vehicle C"s CTS and vehicle C is waiting for vehicle A and vehicle B to finish communicating. The handshaking methods are less efficient than collision detection approaches, as in the tight cluster situation, and can lead to network gridlock under certain conditions.

It would therefore be desirable to develop a wireless mobile communication network for vehicle-to-vehicle communication that is feasible to implement for various approaching vehicle situations, that overcomes the above mentioned timing issues, and that is cost effective.

SUMMARY OF INVENTION

The present invention provides a method and apparatus for communicating between multiple vehicles in close proximity to each other. An inter-vehicle wireless communication and warning system for a host vehicle within a wireless communication network is provided. The system includes a first variable antenna that receives a vehicle discovery signal and a variable amplifier that is electrically coupled to the first variable antenna, which modifies the vehicle discovery signal. A smart transmission antenna focuses and transmits a pattern signal to at least another vehicle in the wireless communication network. A smart antenna amplifier is electrically coupled to the smart antenna and modifies the pattern signal. A main controller is electrically coupled to the variable amplifier, the smart antenna amplifier, and a vehicle network. The main controller generates the pattern signal in response to the vehicle discovery signal and a vehicle network signal.

One of several advantages of the present invention is the incorporation of smart antennas and smart antenna control into an inter-vehicle communication system. In so doing, a vehicle-communication pattern may be adjusted to meet a particular communication requirement. Additionally, the smart antennas allow for quick switching between patterns.

Another advantage of the present invention is the synchronization of a global clock signal and vehicle communication patterns, thereby, minimizing interference between neighboring transceivers and allowing concurrent vehicle communication involving several patterns that are not interfering with each other.

Furthermore, the present invention utilizes multiple vehicle technologies that are widely available to minimize additional costs to a vehicle system.

Other advantages and features of the present invention will become apparent when viewed in light of the detailed description of the preferred embodiment when taken in conjunction with the attached drawings and appended claims.

DETAILED DESCRIPTION

Figure 1:
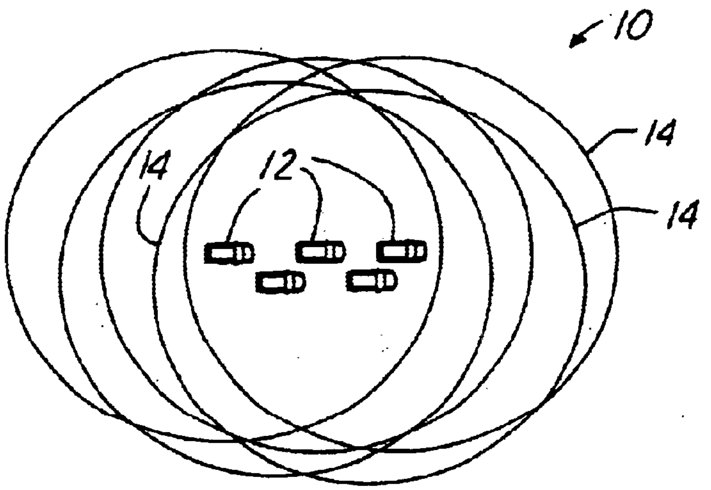
(Prior Art) FIG. 1
FIG. 1 is a vehicle communication signal pattern diagram for multiple vehicles in a tight cluster situation using ad hoc vehicle communication and omni-directional antennas.
Figure 2:
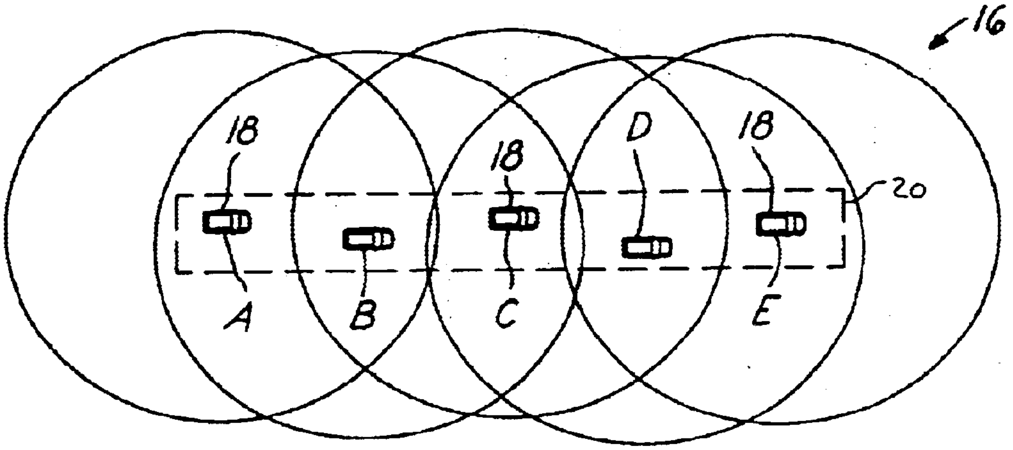
(Prior Art) FIG. 2
FIG. 2 is a vehicle communication signal pattern diagram for multiple vehicles in a spread out cluster situation using ad hoc vehicle communication and omni-directional antennas.

In each of the following figures, the same reference numerals are used to refer to the same components. While the present invention is described with respect to a method and apparatus for communicating between multiple vehicles in a close proximity of each other, the present invention may be adapted to be used in various systems including: automotive vehicle systems, control systems, communication systems, or other systems that may utilize a smart antenna or the like.

In the following description, various operating parameters and components are described for one constructed embodiment. These specific parameters and components are included as examples and are not meant to be limiting.

Figure 3:
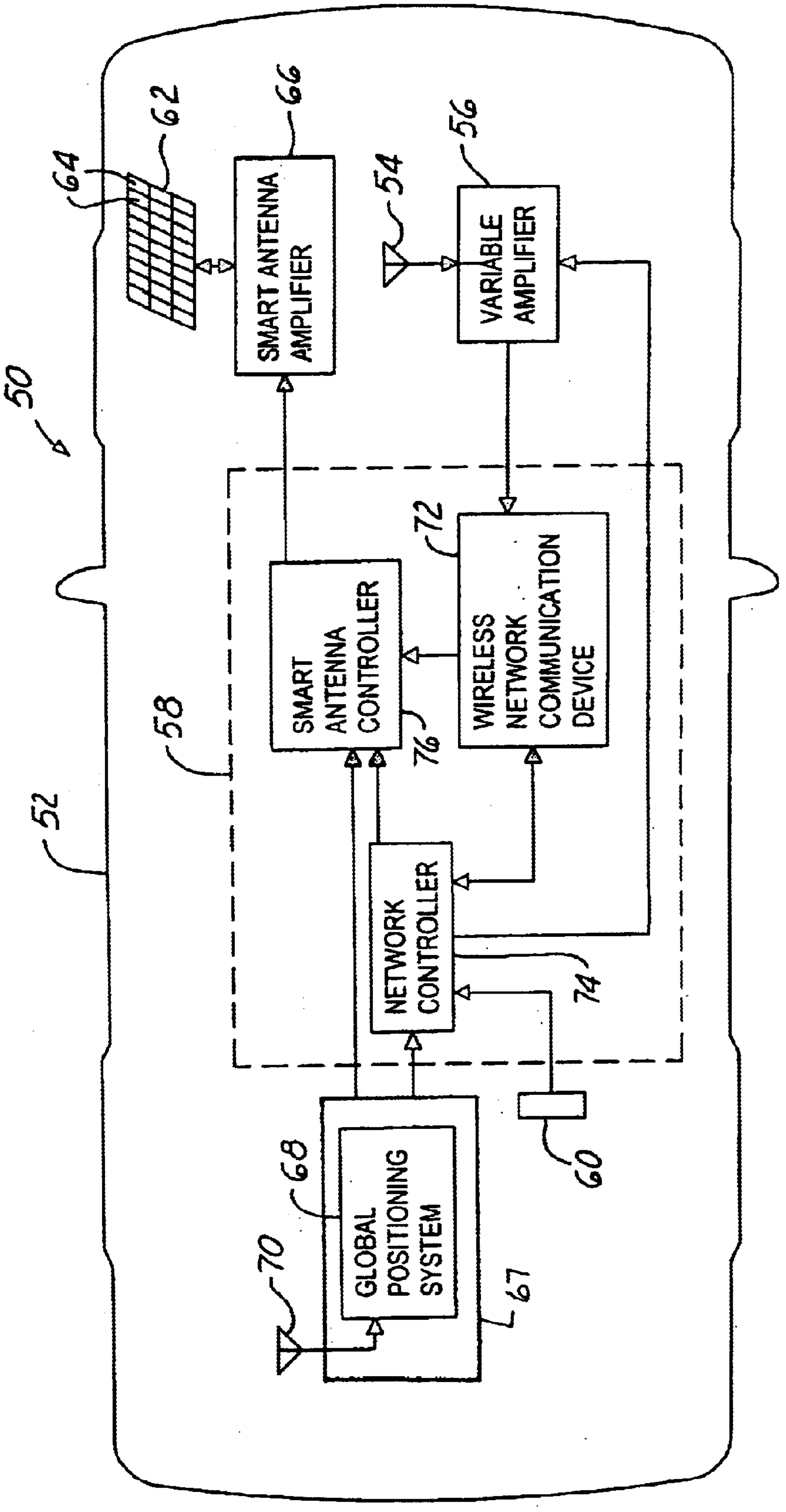
FIG. 3 is a block diagrammatic view of an inter-vehicle wireless communication and warning system in accordance with an embodiment of the present invention.

Referring now to FIG. 3, a block diagrammatic view of an inter-vehicle wireless communication and warning system 50 for a host vehicle 52 in accordance with an embodiment of the present invention, is shown. The system 50 includes a first variable antenna 54 electrically coupled to a variable amplifier 56, which is electrically coupled to a main controller 58. The variable amplifier 56 is a low gain amplifier that modifies vehicle discovery signals received from the first variable antenna 54. The main controller 58 is also electrically coupled to a vehicle network 60, which generates a network signal. The vehicle discovery signals and the network signal may include vehicle proximity information relative to the host vehicle 52. The main controller 58 combines vehicle information received from the first variable antenna 54 and the vehicle network 60, and through the use of ad hoc communication, generates and transmits a pattern signal via a smart antenna 62 having multiple elements 64. The pattern signal is modified by a smart antenna amplifier 66 and is focused and transmitted by the smart antenna 62 to multiple vehicles in close proximity of the host vehicle 52. A vehicle direction prediction device 67 is electrically coupled to the main controller 58 and contains a global positioning system 68 that aids in timing of communication signals and in vehicle location determination. The global positioning system 68 receives timing and vehicle data via a second variable antenna 70 and generates a global positioning signal that is utilized by the main controller 58 in generating the pattern signal.

The main controller 58 comprises a wireless network communication device 72, a network controller 74, and a smart antenna controller 76. The main controller 58 is preferably microprocessor-based such as a computer having a central processing unit, memory (RAM and/or ROM), and associated input and output buses. The main controller 58, the communication device 72, the network controller 74, and the smart antenna controller 76 may be a portion of a central control unit or may each be stand-alone components. The main controller 58 adjusts characteristics of the pattern signal such as size, shape, strength, and pattern center.

The vehicle network 60 may be an internal or external vehicle network. The main controller 58 may be electrically coupled to the vehicle network 60 via a personal computer memory card international association (PCMCIA) port, a cardbus, a miniature card, an instrumentation, systems, and automation society (ISA) bus, a peripheral component interface (PCI) bus, or other port, bus, or card known in the art. The vehicle network 60 may contain a central computer or storage center for vehicle network information contained within the network signals.

The communication device 72 facilitates communication between vehicles. The communication device 72 may be a bluetooth device, a local area network (LAN) 802.11 system, or a LAN 802.11b system, a digital short range communication device, an ultra wide band communication device, a wireless network radio, or other wireless communication device that is able to receive and transmit modulated radio frequency signals.

The network controller 74 controls routing of various information between vehicle electronic devices including: the communication device 72, the smart antenna controller 76, the global positioning system 68, and other possible vehicle components not shown such as a navigation system, object detection sensors, countermeasure systems, or other vehicle electronic devices and components. The network controller 74 is electrically coupled to the variable amplifier 56 and may adjust the gain of the amplifier 56.

Figure 4:
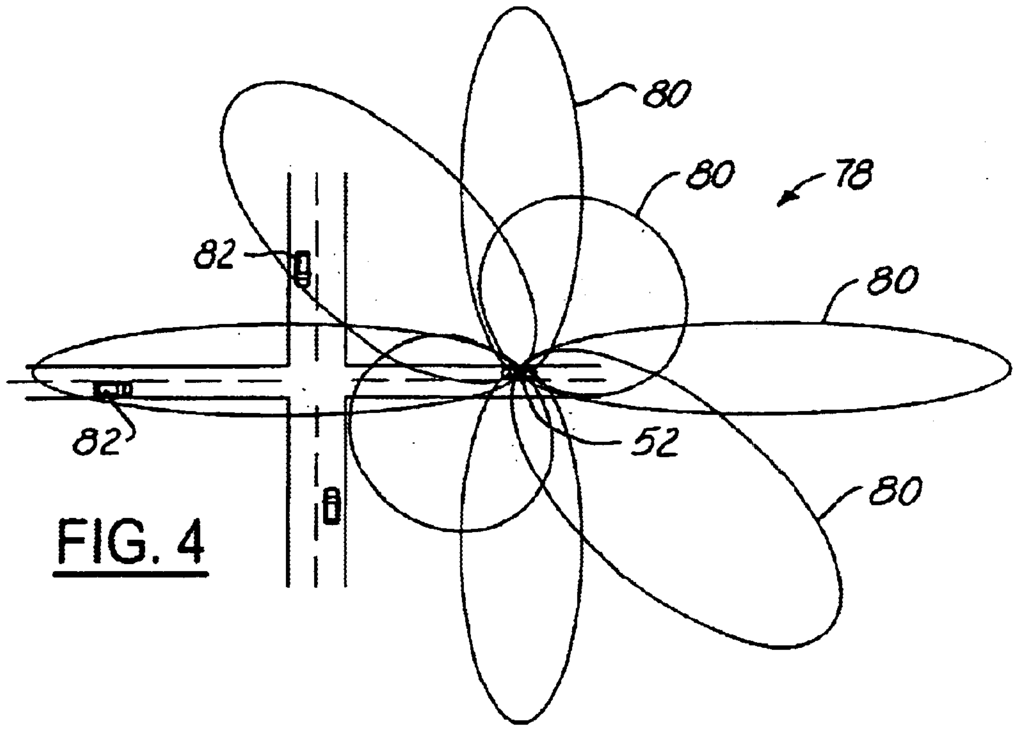
FIG. 4 is a pattern signal diagram for a host vehicle in accordance with an embodiment of the present invention.

The network controller 74 also generates the pattern signal 78. The pattern signal 78 may comprise multiple patterns 80, as best seen in FIG. 4. Each pattern 80 is associated with vehicle information directed to an adjacent vehicle 82 in close proximity with the host vehicle 52. The pattern signal 78 may, contain vehicle communication information pertaining to multiple vehicles including the host vehicle or may serve as a type of beacon transmitting host vehicle information so as to alert other vehicles in or approaching the host vehicle 52. The pattern signal 78 may be omni-directional, uni-directional, or multi-directional. In other words, the pattern signal may be transmitted equally in all directions, primarily in a single direction, or in multiple predetermined directions depending upon the situation. The pattern signal is generally received and upon reception transmitted without altering data content of the pattern signal.

Figure 5:
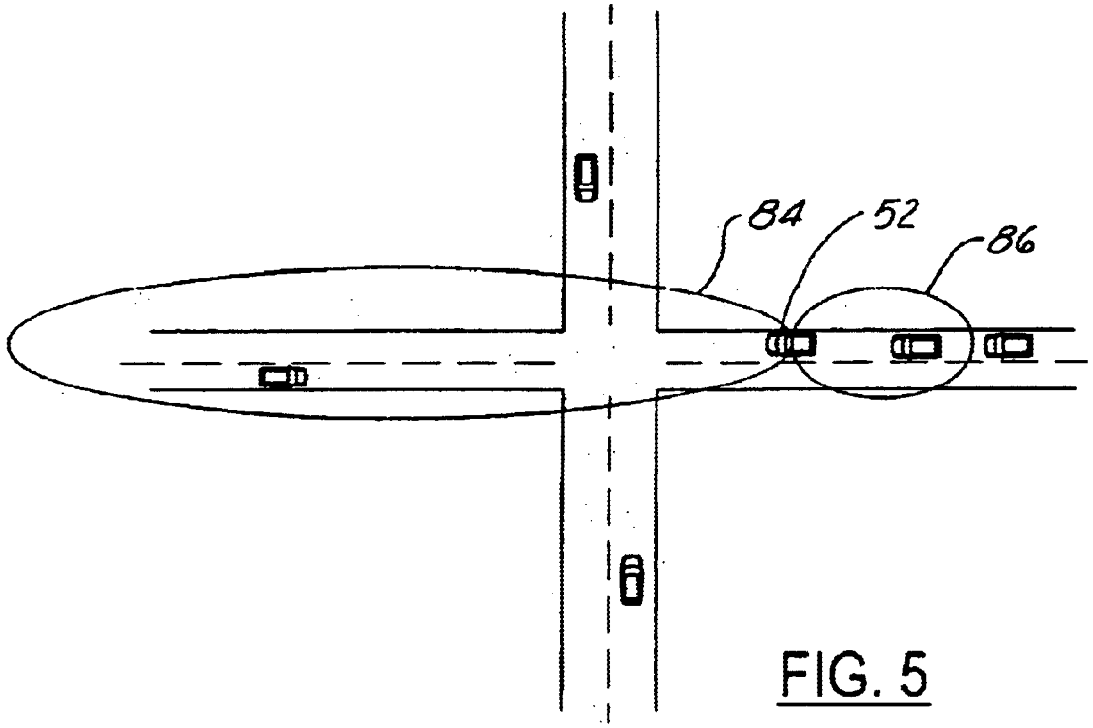
FIG. 5 is a skewed pattern diagram of a transmitted pattern signal in accordance with an embodiment of the present invention.

The smart antenna controller 76 adjusts the amplitude, timing, orientation, skewing, and shape of the pattern signal by adjusting electrical characteristics associated with the smart antenna 62. For example, the smart antenna controller 76 may focus transmission power of the smart antenna 62 in a forward direction leaving little power for transmission in a rearward direction, as best seen in FIG. 5 and represented by patterns 84 and 86, respectively. The smart antenna controller 76 in order to focus the transmission power delays signal transmission to certain elements within the smart antenna 62, in turn adjusting the phase of the communication signal being transmitted by the selected elements.

The smart antenna 62 consists of the phase array of antenna elements 64 in a patch of film with each element electrically coupled to a solid-state delay device and a variable amplifier. The variable amplifier represented by smart antenna amplifier 66. Smart antenna 62 may incorporate the first variable antenna 54 and the second variable antenna 70 into a single smart antenna. Smart antennas in general are able to switch between signal patterns in milliseconds, which is much faster than the time duration of typical traffic events or collisions. Therefore, several pattern signals may operate concurrently without interfering with each other.

Time domain of the main controller 58 is divided into periods, in each period at least one specific function is performed. Vehicles utilizing system 50, which are in close proximity with each other, are synchronized dynamically in order to perform the specific functions in an appropriate sequential order. The specific functions may include: inquiry and discovery of vehicle related data, transmitting and receiving data to and from a vehicle forward of or behind the host vehicle 52, or transmitting and receiving data to vehicles that are to the left or to the right of the host vehicle 52. The time domain may be synchronized through the use of the GPS system 68, or by other methods known in the art.

Figure 6A:
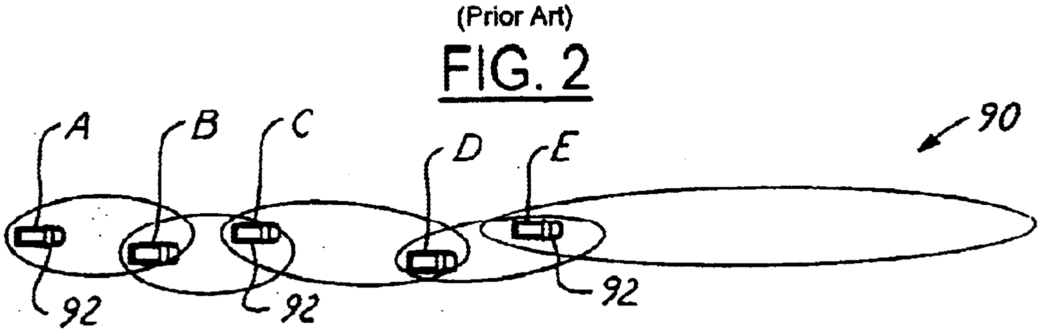
FIG. 6A is a vehicle communication signal pattern diagram for multiple vehicles in a spread out cluster situation, communicating in a forward direction, using the inter-vehicle wireless communication and warning system and ad hoc vehicle communication in accordance with an embodiment of the present invention.
Figure 6B:
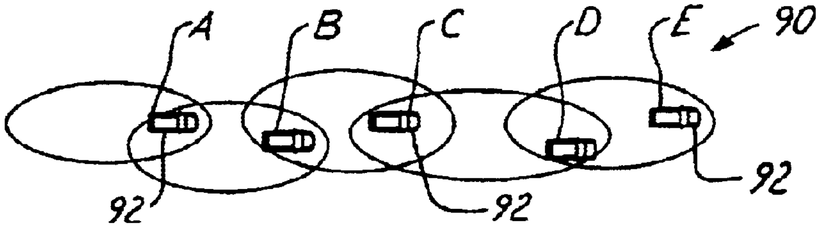
FIG. 6B is a vehicle communication signal pattern diagram for multiple vehicles in a spread out cluster situation, communicating in a rearward direction, using the inter-vehicle wireless communication and warning system and ad hoc vehicle communication in accordance with an embodiment of the present invention.

Referring now to FIGS. 6A and 6B, vehicle communication signal pattern diagrams 90 for multiple vehicles 92 in a spread out cluster situation, is shown. Each vehicle 92 is using the inter-vehicle wireless communication and warning system 50 and ad hoc vehicle communication in accordance with an embodiment of the present invention. The signal patterns 94 using smart antennas may be directed toward a communication vehicle of interest in a cluster of vehicles. The smart antenna pattern signals may be adjusted in size, shape, and pattern signal center to meet a particular communication requirement.

The combination of smart antennas and global positioning systems in multiple vehicles allows for more effective arbitration of communication between vehicles. For example, instead of using request to send and clear to send commands and various handshaking protocols, synchronized communication between the vehicles 92 may occur. In a first time interval, messages may be transmitted in a forward direction from vehicle A to vehicle B, followed by vehicle B transmitting messages to vehicle C, followed by vehicle C transmitting messages to vehicle D, and finally vehicle D transmitting messages to vehicle E. In a second time interval, messages may be transmitted in a rearward direction, from vehicle E to vehicle D, from vehicle D to vehicle C, from vehicle C to vehicle B, and finally from vehicle B to vehicle A. By synchronizing transceivers in multiple vehicles by a global clock signal from the global positioning units, pattern signals may be altered in unison, reducing interference between transceivers in close proximity.

Figure 7:
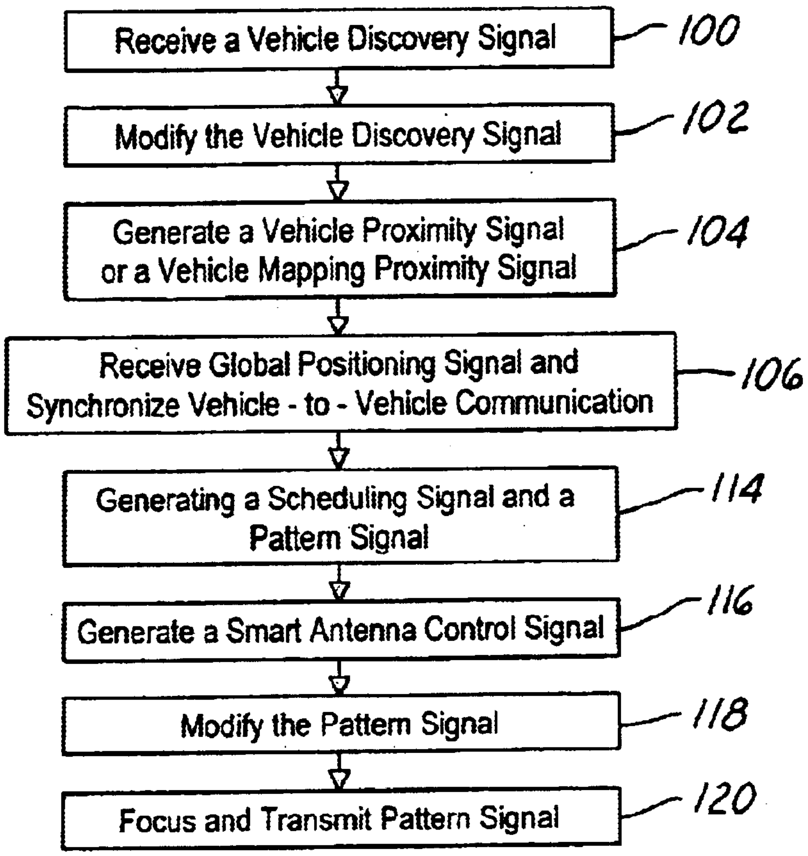
FIG. 7 is a logic flow diagram illustrating a method of communicating between a plurality of vehicles within a close proximity of each other in accordance with an embodiment of the present invention.

Referring now to FIG. 7, a logic flow diagram illustrating a method of communicating between a plurality of vehicles within close proximity of each other in accordance with an embodiment of the present invention, is shown.

In step 100, the first variable antenna 54 receives a vehicle discovery signal from a vehicle in close proximity to the host vehicle 52. The vehicle discovery signal may be in the form of a pattern signal or other vehicle-to-vehicle communication signal. The vehicle discovery signal, similar to a pattern signal, may include vehicle information relative to the host vehicle 52 such as vehicle traveling velocity, vehicle distance, vehicle location, or other vehicle information known in the art. The vehicle information may pertain to the host vehicle 52 or one or more vehicles in close proximity to the host vehicle 52.

In step 102, the variable amplifier 56 amplifies or attenuates the vehicle discovery signal depending upon the vehicle situation. When the host vehicle 52 is in a congested traffic situation the received vehicle discovery signal may be attenuated as opposed to when the host vehicle 52 is operating on an open road where few or no vehicles are near the host vehicle 52. The communication device 72 may block a received vehicle discovery signal in response to a vehicle discovery signal characteristic such as power. For example, when a received vehicle discovery signal is below a predetermined power level the corresponding vehicle that transmitted the vehicle discovery signal is not in close proximity with the host vehicle 52 and the communication device 72 ignores the received vehicle discovery signal. Blocking of certain received signals aids in minimizing interference between vehicle pattern signals.

In step 104, the communication device determines and stores one or more vehicle proximity parameters relative to the host vehicle 52 in response to the vehicle discovery signal and the vehicle network signal to generate a vehicle proximity signal. The proximity signal may contain vehicle locations, vehicle velocities, vehicle distances, or other vehicle characteristic information relative to the host vehicle 52. The communication device 72 may generate in conjunction with or in replacement of the vehicle proximity signal, a vehicle mapping proximity signal in response to a mapping signal generated by the network controller 74, in step 110.

In step 106, the global positioning system 68 receives a global positioning signal via the second omni-directional antenna 70. The global positioning signal may include a global clock signal and mapping information. The global clock signal is used to synchronize communication between multiple vehicles in a close proximity. The global clock signal is received by each vehicle, in a cluster of vehicles, simultaneously. Each vehicle sets a respective internal clock to match the global clock signal. The network controller 74 may alternate between the received discovery signal and the pattern signal in response to the global clock signal.

Upon synchronization the smart antenna controller 76 may set the smart antenna 62 and the smart antenna amplifier 66 to transmit a certain pattern signal. The certain pattern signal may contain data received from the network signal and is transmitted for a predetermined time frame and for a specific function. The main controller 58 may utilize the global clock signal when dictating the timing sequence for performing the specific functions.

Figure 8:
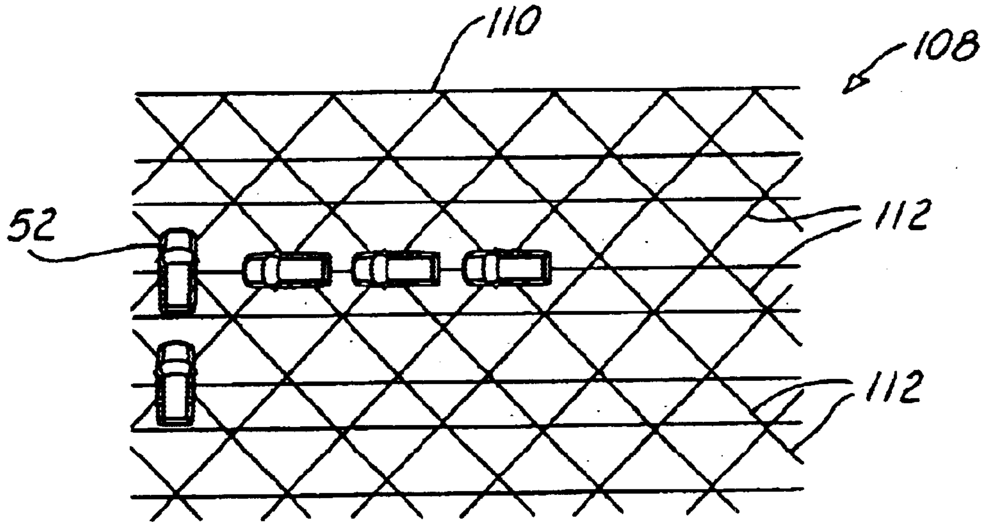
FIG. 8 is a sample network topology diagram in accordance with an embodiment of the present invention.

Since vehicles, utilizing system 50, are able to transmit and receive communication signals in multiple directions simultaneously, and switch directions quickly, a network topology 108 may be defined and mapped into a grid 110, as best seen in FIG. 8. The mapping information includes vehicle location information associated to the grid 110. By using smart antennas to skew signal patterns and adjust amplitude and system sensitivities such that only desired adjacent vehicles communicate, the grid is conformal. That is, the network topology may be mapped onto a grid of polygons 112 that all have the same dimension. The use of a network topology prevents network congestion and simplifies routing of communication signals.

Referring again to FIG. 7, in step 114, the network controller 74 generates a scheduling signal and a pattern signal in response to a vehicle network signal and the global positioning signal. The scheduling signal includes scheduling information for the smart antenna patterns, which is used in synchronizing transmission and reception with the patterns. The vehicle network signal may be generated from a host vehicle object detection sensor, a navigation system, or other vehicle electronic device. The network controller 74 may also generate a mapping signal in response to the global positioning signal. The mapping signal contains vehicle location information corresponding to a polygon 112.

The pattern signal may be generated in response to a prediction signal from the prediction device 67. The prediction signal may include directional information corresponding to the host vehicle direction of travel and road curvature. The pattern signal may be directed in various directions via the smart antenna 62 to account for changes in road curvature. The prediction device 67 may include the GPS 68 as shown or may also include other road curvature and directional prediction devices such as a navigation system or other prediction systems known in the art. The prediction device may also monitor acceleration and deceleration activities of the host vehicle 52 to determine road curvature and direction of travel. The systems and methods, used within the prediction device 67, to predict road curvature and vehicle direction of travel may be used individually or in combination depending upon the sophistication of the system 50. For example, a navigation system may predict road curvatures that the GPS 68 may not be able to predict and vice versa.

In step 116, the smart antenna controller 76 generates smart antenna control signal in response to one or a combination of the vehicle proximity signal, the global positioning signal, the global clock signal, or the vehicle mapping proximity signal. The smart antenna controller 76 may alternate between signal patterns to perform various communication functions, such as, pulling information from adjacent vehicles, beaconing communication signals in a forward, rearward, or lateral direction, or other communication functions known in the art. The communication functions may correspond to time slots such that vehicles within a given cluster of vehicles are in co-operation with each other.

In step 118, the smart antenna amplifier 66 amplifies or attenuates the pattern signal before transmission depending upon the vehicle situation. Similar to the variable amplifier, as stated above.

In step 120, the smart antenna 62 focuses and transmits the pattern signal to one or more vehicles in response to the smart antenna control signal.

The above-described steps are meant to be an illustrative example, the steps may be performed synchronously or in a different order depending upon the application.

Also throughout the above-described steps, the main controller 58 or the vehicle network 60 may be continuously collecting and sorting incoming vehicle related data contained within signals, such as the pattern signal, the discovery signal, the network signal, or other vehicle related signals. The vehicle related data may be stored and partitioned for the various specific functions, mentioned above. The main controller 58 may also be continuously monitoring for incoming pattern signals, or the like.

The present invention incorporates the advantages associated with ad hoc communication systems, smart antennas, and global positioning systems with commonly used vehicle electronic devices and additional control logic into a single inter-vehicle wireless communication and warning system. The present invention is self-supporting, has quick communication capability between vehicles, and has no single point of failure allowing safety related data to be reliably and quickly communicated. The present invention also provides quick switching, direct communication, and minimum interference of pattern signals.

The above-described apparatus, to one skilled in the art, is capable of being adapted for various purposes and is not limited to the following systems: automotive vehicle systems, control systems, communication systems, or other systems that may utilize a smart antenna or the like. The above-described invention may also be varied without deviating from the spirit and scope of the invention as contemplated by the following claims.

What is claimed is:

1. An inter-vehicle wireless communication and warning system for a host vehicle within a wireless communication network comprising:

a first variable antenna receiving a vehicle discovery signal;

a variable amplifier electrically coupled to said first variable antenna and modifying said vehicle discovery signal;

a smart transmission antenna focusing and transmitting a pattern signal to at least another vehicle in the wireless communication network;

a smart antenna amplifier electrically coupled to said smart antenna and modifying said pattern signal; and a main controller electrically coupled to said variable amplifier, said smart antenna amplifier, and a vehicle network, said controller generating said pattern signal in response to said vehicle discovery signal and a vehicle network signal.

2. A system as in claim 1 wherein said main controller utilizes ad hoc communication techniques.

3. A system as in claim 1 wherein said controller comprises:

a wireless network communication device electrically coupled to said variable amplifier and said network controller and storing one or more vehicle proximity parameters relative to the host vehicle and generating a vehicle proximity signal in response to said vehicle discovery signal;

a network controller generating a pattern scheduling signal and a pattern signal in response to a vehicle network signal and a vehicle proximity signal; and a smart antenna controller electrically coupled to said wireless network communication device and said network controller and generating a smart antenna control signal in response to said vehicle proximity signal and said pattern scheduling signal.

4. A system as in claim 1 wherein said variable amplifier is an omni-directional amplifier or a smart antenna amplifier.

5. A system as in claim 1 wherein said first variable antenna is an omni-directional antenna or a smart antenna.

6. A system as in claim 1 wherein said smart transmission antenna comprises said first variable antenna.

7. A system as in claim 1 further comprising:

a vehicle direction prediction device predicting changes in road curvature and generating a prediction signal;

said main controller generating said pattern signal in response to said prediction signal.

8. A system as in claim 1 further comprising a global positioning system electrically coupled to a second variable antenna and said main controller, said global positioning system generating a global positioning signal and said main controller generating said pattern signal in response to said global positioning signal.

9. A system as in claim 7 wherein said global positioning signal comprises information related to at least one of: a global positioning system clock, vehicle proximity information relative to the host vehicle, vehicle velocity information relative to the host vehicle, and vehicle mapping data.

10. A system as in claim 7 wherein said global position system generates a global clock signal and said main controller generates said pattern scheduling signal and said pattern signal in response to said global clock signal.

11. A system as in claim 7 wherein said smart transmission antenna comprises said second variable antenna.

12. A system as in claim 7 wherein said main controller generates a mapping signal in response to said global positioning signal and determines at least one vehicle proximity parameter relative to the host vehicle in response to said mapping signal and generates a vehicle mapping proximity signal.

13. A system as in claim 12 wherein said main controller generates said pattern signal in response to said vehicle mapping proximity signal.

14. A system as in claim 1 wherein said main controller alternates between patterns to implement communication functions.

15. An inter-vehicle wireless communication and warning system for a host vehicle within a wireless communication network comprising:

a smart transmission antenna receiving a vehicle discovery signal;

a first antenna amplifier electrically coupled to said smart transmission antenna and modifying said vehicle discovery signal;

a wireless network communication device electrically coupled to said first antenna amplifier and said network controller and storing one or more vehicle proximity parameters relative to the host vehicle and generating a vehicle proximity signal in response to said vehicle discovery signal;

a global positioning system electrically coupled to said smart transmission antenna and generating a global positioning signal;

a network controller electrically coupled to a vehicle network and said global positioning system and generating a pattern scheduling signal and a pattern signal in response to a vehicle network signal, said vehicle proximity signal, and said global positioning signal;

a smart antenna controller electrically coupled to said wireless network communication device, said network controller, and said global positioning system and generating a smart antenna control signal in response to said vehicle proximity signal, said pattern scheduling signal, and said global positioning signal; and a smart antenna amplifier electrically coupled to said smart antenna controller and modifying said pattern signal;

said smart transmission antenna focusing and transmitting said pattern signal to one or more vehicles in the wireless communication network.

16. A system as in claim 15 wherein said global position system generates a global clock signal and said network controller generates said pattern scheduling signal and said pattern signal in response to said global clock signal.

17. A method of communicating between a plurality of vehicles within a close proximity of each other comprising:

receiving a vehicle discovery signal at a host vehicle;

modifying said vehicle discovery signal;

generating a vehicle proximity signal in response to said vehicle discovery signal;

generating a pattern scheduling signal and a pattern signal in response to a vehicle network signal and said vehicle proximity signal;

generating a smart antenna control signal in response to said pattern scheduling signal and said vehicle proximity signal;

modifying said pattern signal; and focusing and transmitting said pattern signal to at least one other vehicle.

18. A method as in claim 17 further comprising:

generating a global positioning signal; and generating said pattern signal in response to said global positioning signal.

19. A method as in claim 18 further comprising:

generating a mapping signal in response to said global positioning signal;

determining one or more vehicle proximity parameters relative to the host vehicle in response to said mapping signal and generating a vehicle mapping proximity signal; and generating said pattern signal in response to said vehicle mapping proximity signal.

20. A method as in claim 17 further comprising:

generating a global clock signal; and generating said pattern scheduling signal and said pattern signal in response to said global clock signal.

* * * * *